United States Patent Office 3,399,732
Patented Sept. 3, 1968

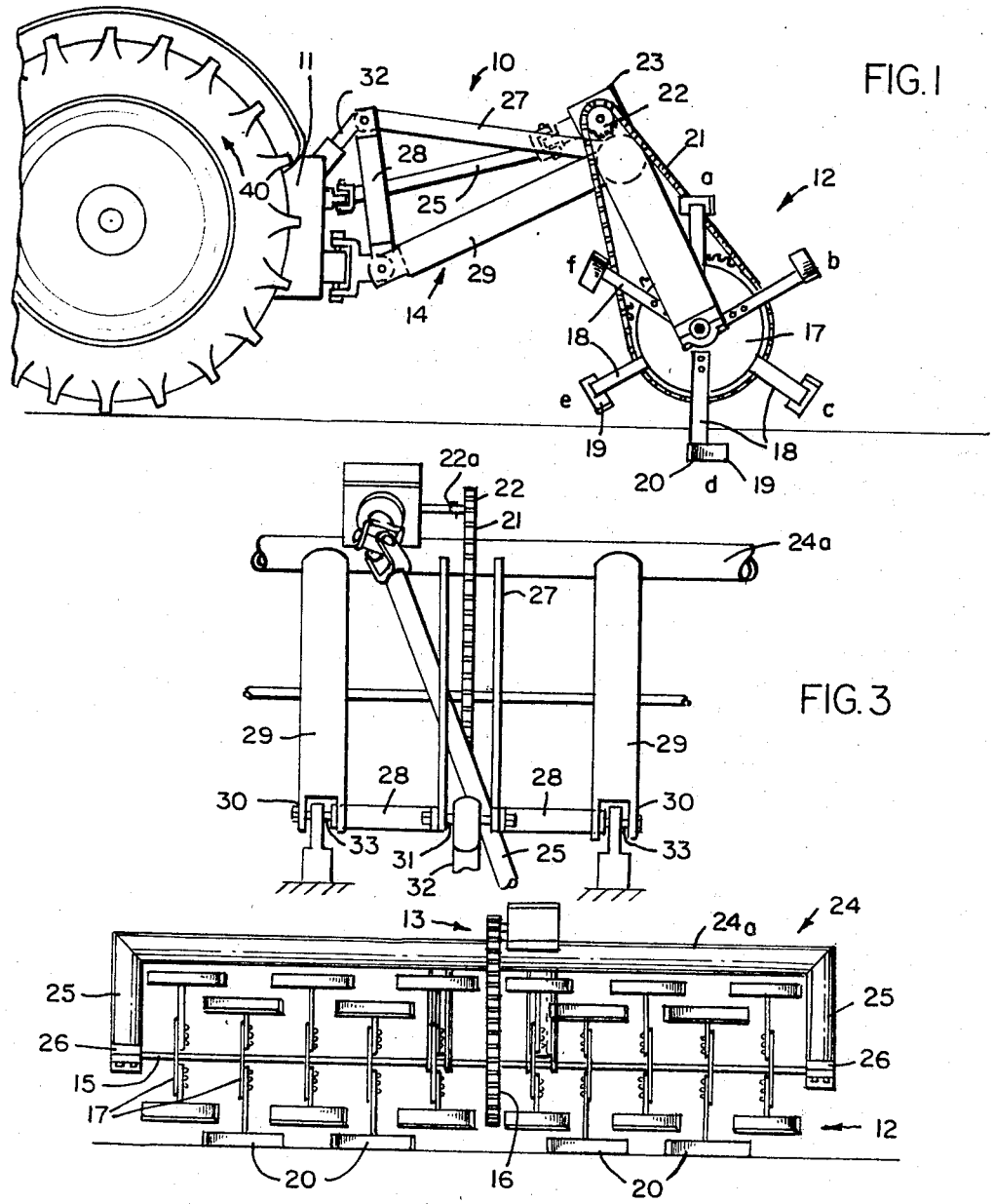

3,399,732
CULTIVATING MEANS AND METHOD
John C. Prejean, Lafayette, La. 70501
Filed Oct. 14, 1965, Ser. No. 495,925
7 Claims. (Cl. 172—1)

ABSTRACT OF THE DISCLOSURE

A cultivating means and method is provided to prepare level mud-covered surfaces for rice growing. A cultivating machine comprises a frame, a central elongated axle and a plurality of cultivating blades positioned to extend radially outwardly from the axle and move in a circular path around the axle with the blades being positioned perpendicular to the ground in their lowermost position. Thus, ridges of soil can be moved forwardly over a wet field while simultaneously moving the ridges in a side to side direction to form a level layer of loosely compacted soil over a substantially level ground base.

---

The preparing of seed beds for rice planting by the commonly used water method creates many problems. Commonly a field is flooded after which germinated rice seeds are planted as by aerial dispersion onto the muddy surface of the field. This has created problems in that when the field dries, a crust forms which can damage germinating seeds. Moreover, since such fields are normally irregularly surfaced, puddles remain after flooding in which the rice seeds can accumulate and be scalded when exposed to a hot sun. It has been recognized that a level mudded surface would be preferable in planting rice.

In an effort to provide level surface on rice planting fields, drags consisting of beams, either wood or steel, are sometimes pulled by a tractor over a plowed and flooded field. Such drags effectively compact the soil and detract from healthy growth of seeds planted therein. Moreover, the drags create problems since mud tends to accumulate in front of the drags and slows down or hampers operation of the tractor. In addition transport of the drags particularly over levies and other obstacles is difficult.

It is an important object of this invention to provide a novel cultivating machine for preparing an ideal bed for the planting of rice and the like.

Another object of this invention is to provide a machine in accordance with the preceding object which is relatively lightweight and can be operated at rapid speeds with ease of control by a tractor operator.

Still another object of this invention is to provide a machine in accordance with the preceding objects which is highly efficient and not subject to frequent clogging and breakdown.

Still another important object of this invention is to provide a machine in accordance with the preceding objects which can be operated to free rice seed beds of weeds while loosely arranging wet soil thereover to provide a substantially level surface for planting and which permits growing of high quality rice with outstanding yields per acre.

According to the invention a cultivating machine comprises a frame for attachment to a conventional tractor or other pulling means. A central elongated axle is mounted on the frame and a plurality of cultivating blades are positioned outwardly of the axle along a plurality of spaced generally circular paths therearound. The blades each have a cutting edge and preferably are substantially planar. The blades are arranged in a plurality of side to side rows in the paths with each blade in each row being positioned with its edge set at an acute angle with respect to the axle. The blades of each row are arranged at substantially equal angles with respect to the shaft and the blades of alternate rows are arranged at substantially equal angles and are tilted in opposite side to side directions to the angles of blades of adjacent rows. The machine of this invention is easily operable at high speeds over a field which has been flooded to scrape away the top layer to form a level base and rearrange the top layer to loosely compact it forming a level muddy top surface. The soil top layer is moved substantially in ridges forwardly in the direction of the tractor over the wet field while soil of the ridges is also moved in a side to side direction as along a zig zag path to form a level layer of loosely compacted soil over a substantially level ground base.

It is a feature of this invention that the machine can be attached to a power supply of a conventional tractor and can be operated by a single tractor driver to rapidly cultivate a field.

These and other features, objects and advantages of the present invention will be better understood with reference to the following description when read in conjunction with the accompanying drawings, in which:

FIG. 1 is a side view of a preferred embodiment of the machine of this invention hitched to the rear end of a conventional tractor;

FIG. 2 is a rear view thereof; and,

FIG. 3 is a top plan view of the attachment between the preferred embodiment and a conventional tractor.

With reference now to the drawings, the cultivator machine of this invention is indicated generally at 10 in FIG. 1 connected with the rear end of a conventional tractor 11. The machine 10 consists of a blade assembly 12, a drive assembly 13 and a linkage assembly 14.

The blade assembly comprises a central elongated substantially horizontal shaft or axle 15 freely rotatable on the frame. A center drive sprocket 16 is welded or otherwise mounted on the shaft 15. In some cases shaft 15 may be formed of two portions meeting at and joined by the drive sprocket 16. A plurality of discs 17 are mounted at spaced intervals on the shaft by welding or other conventional means. In the preferred embodiment the shaft 15 is made of two equal lengths of rigid pipe 5 feet long attached to the sprocket, discs 17 are 12 inches in diameter and are spaced approximately 11 inches apart. Radially depending bars or plates 18 are preferably bolted to each disc. In the preferred embodiment three bars 18 are bolted to each disc spaced 120° apart relative to the shaft and each carry a planar cutting blade 19 having a cutting edge 20. In the preferred embodiment the blades are rectangular and have a length of 14 inches and a height of 3 inches. The blades may be mounted on the plates 18 by conventional means such as welding, bolting, etc. It should be understood that various changes in dimensions may be made although it is preferred that the blades 19 always be positioned so as to be perpendicular to the ground when in their lowermost operative position as shown by the lower plate in FIG. 1.

Each disc is preferably position 60° out of phase with its adjacent discs to form six rows of blades, a, b, c, d, e and f, extending from side to side of the frame with each of the blade edges being spaced substantially the same radial distance from the axle 15. In the preferred embodiment the edges lie on a cylindrical path having a diameter of approximately twenty-four inches and the rows are parallel to each other and to the axle. Each blade in each row and in all rows is tilted slightly so that its plane if extended would meet the axle 15 at approximately an angle of 20°. However, while each blade in each row is tilted at the same angle, that is, when looking from the rear, the left hand end of each blade of one row would be lower than the right hand end of that blade in that row, the blades of adjacent rows are tilted opposite to the tilt of the rows on each side of it. Thus, in FIG. 1, row A has each of its blades tilted with their left hand end lowermost and their right hand end uppermost while row B has each blade tilted with its left hand end uppermost and its right hand end lowermost when looking at the rear end of the tractor.

The tilting of the blades in the angular position shown cooperate when the axle is turned and the blades positioned approximately 4 to 6 inches deep in soil flooded with water so that ridges of mud can be moved forwardly over a wet field while moving the ridges in a side to side direction to form a level layer of loosely compacted soil over a substantially level firm ground base.

The axle 15 preferably is mounted for turning in a clockwise direction, opposed to the direction of travel of tractor wheel 40, by the drive means comprising an endless chain 21 extending from the drive sprocket 16 to a sprocket 22 of a gear reduction box 23 mounted on the frame 24. The gear reduction box can be of any conventional design and is used to transmit power from a power takeoff shaft 25 connected to a tractor through a shear pin 22A shown in FIG. 3. Rotation of shaft 25 turns to actuate the gear reduction box and on engagement of the manually operated clutch on the tractor the axle 15 is rotated. The drive shaft 25 can easily be disconnected from the machine 10 by over extending its telescopic action or removable links in either of its Y yoke ends as is well known.

The frame 24 preferably comprises a rigid horizontal member 24a which can be a tubular pipe having downwardly depending welded arms 25 on either side which carry rotatable journals 26 freely mounting the shaft 15 in a horizontal position therebetween. The frame 24 is preferably rigidly attached to a plurality of brackets 27 extending on either side of the drive chain 21 to upstanding bars 28. Ends of the bars 28 extend downwardly as best shown in FIGS. 1 and 3 to meet with bars 29 at end yokes 30. The bars 29 are in turn rigidly connected to the frame 24 at their rearward end as best shown in FIGS. 1 and 3 as by welding or bolting. Thus, there is provided a linkage means for linking the machine of this invention to a conventional tractor.

As best seen in FIG. 3, pin 31 interconnects the brackets 27 with one point of the tractor as for example mounting shaft 32 while pins 33 interconnect the bars 29 with two other horizontally spaced points on the rear end of the tractor. Three point linkage of the machine of this invention to a tractor rear end is preferred since by raising or lowering shaft 32, the mechanism of this invention can be raised or lowered as desired during operation of the tractor. Various linkages can be employed to permit raising or lowering of the blade assembly.

Turning now to the operation of the machine of this invention, the assembly is preferably used over a field which has been flooded with water, the tractor is started and moved forward in the direction of arrow 40 while the drive and power takeoff shaft 24 causes rotation of the shaft 15 in the direction of arrow 41. As the tractor moves it pulls the machine 10 behind it preferably with the edges 20 extending from 4 to 6 inches into the soil which may be flooded with 6 to 8 inches of water. Since the blades preferably overlap except for a small gap at the center point of the axle, ridges of soil are moved forward and sidewardly by each row as they contact the ground. As one row of blades rotates past its contact with the ground, a second row of blades enters the ground and moves the ridge of soil forwardly and sideways in an opposite direction to its previous direction thereby loosening and finely distributing particles of the soil to form a level surface behind the machine 10 as it passes over the ground.

While a specific preferred embodiment of this invention has been shown and described, it should be understood that many variations thereof are possible. The particular number of blades, their angular relationship with respect to said axle and their size may be varied in accordance with the power of the pulling tractor and the particular usage desired. Similarly other dimensions may be suitably modified. Preferably the blades 19 are planar but in all cases they have a lowermost position perpendicular to the surface of the ground into which they cut. In most cases, all elements of the machine are made of metal which adds substantial weight and aids in forcing the cutting blades into the ground to the desired level. In some cases it may be useful to provide outrigger skis depending downwardly from ends 25 of the frame to further support the device. Preferably the triangular linkage assembly 14 supports the device in its operative position and permits raising or lowering of the device as desired, however, other means of attachment can be used. In some embodiments of the invention the blades 19 on one side of the sprocket 16 are all sixty degrees out of phase with blades 19 on the other side of the sprocket. Thus half of the blades in each row across the machine are tilted in one angular direction and half are tilted in the other angular direction to provide a side to center and center to side alternation in each row. In some embodiments center supports can be provided for axle 15 on either side of sprocket 16 extending to frame portion 24a.

This invention is to be limited only by the spirit and scope of the appended claims.

What is claimed is:
1. A cultivating machine comprising:
   a frame,
   a central elongated axle mounted on journals provided on said frame,
   a plurality of substantially planar cultivating blades positioned to extend radially outwardly of said axle along a plurality of spaced generally circular paths therearound,
   said blades each having a cutting edge and being arranged in a plurality of parallel continuous rows in said paths with said rows being substantially parallel to said axle,
   each blade in each row being positioned with its edge set at an acute angle with respect to said axle with the blades of each row arranged at substantially equal angles with respect to said shaft and the blades of alternate rows being arranged at substantially equal angles and tilted in opposite directions to the angles of adjacent rows with the blades of one row spanning between and overlapping projections of the blades of an alternate row, and
   means for simultaneously rotating all of said blades about said axle,
   with the plane of said blades being perpendicular to ground level upon rotation of said axle when said blades are in their lowermost position so as to move ridges of soil forwardly over a field while said blades are moving in a forward direction,

2. A cultivating machine in accordance with claim 1 wherein six rows of blades are provided and said blades are rectangular.

3. A cultivating machine in accordance with claim 1 and further comprising:
   linkage means for connecting said frame to a tractor with said frame being movable to raise and lower it without disconnecting said frame from said tractor.

4. A cultivating machine in accordance with claim 1 wherein said axle is chain driven.

5. A cultivating machine in accordance with claim 4 wherein a drive chain extends about said axle from a sprocket mounted on said frame.

6. A cultivating machine in accordance with claim 5 wherein said frame comprises a horizontal elongated portion having downwardly depending legs,
   said legs carrying journals for free rotation of said axle therein.

7. A method of cultivating wet soil of a rice field to prepare the soil for rice planting comprising:
   flooding the field with several inches of water and while said field is flooded,
   cutting into the soil to a predetermined depth and simultaneously moving ridges of said cut soil forwardly over the field while moving said ridges in a side to side direction and forming a uniform depth level layer of loosely compacted soil over a substantially level ground base.

References Cited

UNITED STATES PATENTS

| | | | |
|---|---|---|---|
| 1,665,532 | 4/1928 | Cook | 172—122 X |
| 1,816,210 | 7/1931 | Chong et al. | 172—556 |
| 2,957,529 | 10/1960 | Kaller | 172—47 X |
| 3,128,729 | 4/1964 | Henson | 172—549 X |
| 2,085,645 | 6/1937 | Fish | 172—767 |

FOREIGN PATENTS 80,766   3/1956   Denmark.

OTHER REFERENCES

Earley Vernon Wilcox, Modern Farmers' Cyclopedia of Agriculture, p. 85, 1952.

ABRAHAM G. STONE, *Primary Examiner.*

J. R. OAKS, *Assistant Examiner.*